United States Patent
Treichler et al.

(10) Patent No.: US 9,098,383 B1
(45) Date of Patent: Aug. 4, 2015

(54) CONSOLIDATED CROSSBAR THAT SUPPORTS A MULTITUDE OF TRAFFIC TYPES

(75) Inventors: Sean J. Treichler, Sunnnyvale, CA (US); Dane T. Mrazek, Redwood City, CA (US); Yin Fung (David) Tang, Sunnyvale, CA (US); David B. Glasco, Austin, TX (US); Colyn Scott Case, Hyde Park, VT (US); Emmett M. Kilgariff, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 371 days.

(21) Appl. No.: 12/792,684

(22) Filed: Jun. 2, 2010

Related U.S. Application Data

(60) Provisional application No. 61/245,177, filed on Sep. 23, 2009.

(51) Int. Cl.
| | | |
|---|---|---|
| *G06F 13/00* | (2006.01) | |
| *H04J 3/14* | (2006.01) | |
| *G06F 5/00* | (2006.01) | |
| *H04L 12/26* | (2006.01) | |
| *H04J 3/16* | (2006.01) | |
| *H04J 3/22* | (2006.01) | |
| *H04L 12/54* | (2013.01) | |

(52) U.S. Cl.
CPC *G06F 13/00* (2013.01); *G06F 5/00* (2013.01); *H04J 3/14* (2013.01); *H04J 3/16* (2013.01); *H04J 3/22* (2013.01); *H04L 12/54* (2013.01)

(58) Field of Classification Search
CPC .............. H04J 3/16; H04J 3/22; H04L 12/56; H04L 12/54; G06F 5/00; G06F 13/00
USPC ......... 370/252, 412, 413, 414, 417, 419, 429, 370/465, 468, 543; 710/52, 58, 60, 317
See application file for complete search history.

(56) References Cited

U.S. PATENT DOCUMENTS

| | | | | |
|---|---|---|---|---|
| 5,287,359 | A * | 2/1994 | Engelse .......................... | 370/503 |
| 5,799,305 | A * | 8/1998 | Bortvedt et al. ...................... | 1/1 |
| 6,067,301 | A * | 5/2000 | Aatresh .......................... | 370/418 |
| 6,104,700 | A * | 8/2000 | Haddock et al. .............. | 370/235 |
| 6,122,711 | A * | 9/2000 | Mackenthun et al. ........ | 711/135 |
| 6,570,876 | B1 * | 5/2003 | Aimoto ......................... | 370/389 |
| 6,728,258 | B1 * | 4/2004 | Okada et al. .................. | 370/463 |
| 6,876,626 | B1 * | 4/2005 | Onoe et al. .................... | 370/229 |
| 6,950,396 | B2 * | 9/2005 | Assa et al. ................. | 370/230.1 |
| 7,127,484 | B2 * | 10/2006 | Kambara et al. ............. | 709/201 |
| 7,200,699 | B2 * | 4/2007 | Bose et al. ..................... | 710/120 |
| 7,212,525 | B2 * | 5/2007 | Moriwaki et al. ............ | 370/386 |

(Continued)

*Primary Examiner* — Thomas J Cleary
*Assistant Examiner* — Christopher A Daley
(74) *Attorney, Agent, or Firm* — Artegis Law Group, LLP

(57) ABSTRACT

One embodiment of the present invention sets forth a crossbar unit that is coupled to a plurality of client subsystems. The crossbar unit is configured to transmit data packets between the client subsystems and includes a high-bandwidth channel and a narrow-bandwidth channel. The high-bandwidth channel is used for transmitting large data packets, while the narrow-bandwidth is used for transmitting smaller data packets. The transmission of data packets may be prioritized based on the source and destination clients as well as the type of data being transmitted. Further, the crossbar unit includes a buffer mechanism for buffering data packets received from source clients until those data packets can be received by the destination clients.

18 Claims, 9 Drawing Sheets

(56) References Cited

U.S. PATENT DOCUMENTS

| | | | |
|---|---|---|---|
| 7,352,761 B2* | 4/2008 | Lodha et al. | 370/412 |
| 7,489,701 B2* | 2/2009 | Lodha | 370/412 |
| 7,602,783 B2* | 10/2009 | Aimoto | 370/392 |
| 7,603,137 B1* | 10/2009 | Elliott | 455/552.1 |
| 7,672,324 B2* | 3/2010 | Yazaki et al. | 370/412 |
| 7,701,856 B2* | 4/2010 | Marcondes et al. | 370/235 |
| 7,783,798 B1* | 8/2010 | Misra et al. | 710/60 |
| 7,822,888 B2* | 10/2010 | Saito et al. | 710/38 |
| 7,870,291 B1* | 1/2011 | Lacroute et al. | 709/240 |
| 7,920,573 B2* | 4/2011 | Suetsugu et al. | 370/395.42 |
| 8,065,465 B1* | 11/2011 | Mrazek et al. | 710/317 |
| 2008/0301708 A1* | 12/2008 | Hamilton | 719/314 |
| 2009/0119481 A1* | 5/2009 | Vishkin | 712/29 |

* cited by examiner

CONSOLIDATED CROSSBAR THAT SUPPORTS A MULTITUDE OF TRAFFIC TYPES

CROSS-REFERENCE TO RELATED APPLICATIONS

This application claims benefit of the United States provisional patent application titled, "Consolidated Crossbar that Supports a Multitude of Traffic Types," filed on Sep. 23, 2009 and having Ser. No. 61/245,177.

BACKGROUND OF THE INVENTION

1. Field of the Invention

The present invention relates generally to the field of data transmission and, more specifically, to a consolidated crossbar that supports a multitude of traffic types.

2. Description of the Related Art

A graphics processing unit (GPU) is a specialized processor that is configured to efficiently process complex graphics and other numerical computations. Each GPU has several on-chip hardware components, such as memory caches and logic operations units, configured to efficiently perform the graphics and numerical computations.

In a typical GPU, hardware components communicate with one another over dedicated channels. For example, the texture units within the GPU communicate with the memory controller via a dedicated channel, and raster operations units communicate with the memory controller via a different dedicated channel. Each of these dedicated channels is designed to service the peak bandwidth requirements of the particular hardware component.

One drawback to a GPU architecture having dedicated channels between the different hardware components is that often times only one of the channels is active, while the others remain idle, thus wasting available bandwidth. Another drawback to such a GPU architecture is that a large area of die-space is needed to implement the dedicated channels, thus increasing production costs and reducing efficiency.

As the foregoing illustrates, what is needed in the art is a GPU architecture where different on-chip hardware components communicate over non-dedicated channels.

SUMMARY OF THE INVENTION

One embodiment of the present invention sets forth a method for transmitting data packets between a plurality of client subsystems. The method comprises the steps of receiving a plurality of higher-bandwidth data packets and a plurality of lower-bandwidth data packets from the plurality of client subsystems, wherein each higher-bandwidth data packet and each lower-bandwidth data packet is associated with a source client subsystem, one or more destination client subsystems and a data type, storing the plurality of higher-bandwidth data packets and the plurality of lower-bandwidth data packets in memory buffers, at each clock cycle, optionally selecting a first higher-bandwidth data packet for transmission to the one or more destination client subsystems associated with the first higher-bandwidth data packet based on one or more pre-determined conditions, and, at each clock cycle, optionally selecting a first lower-bandwidth data packet for transmission to the one or more destination client subsystems associated with the first lower-bandwidth based on the one or more pre-determined conditions.

One advantage of the techniques described herein is that the same crossbar is used to transmit data and commands associated with different components and the available bandwidth is used maximally.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
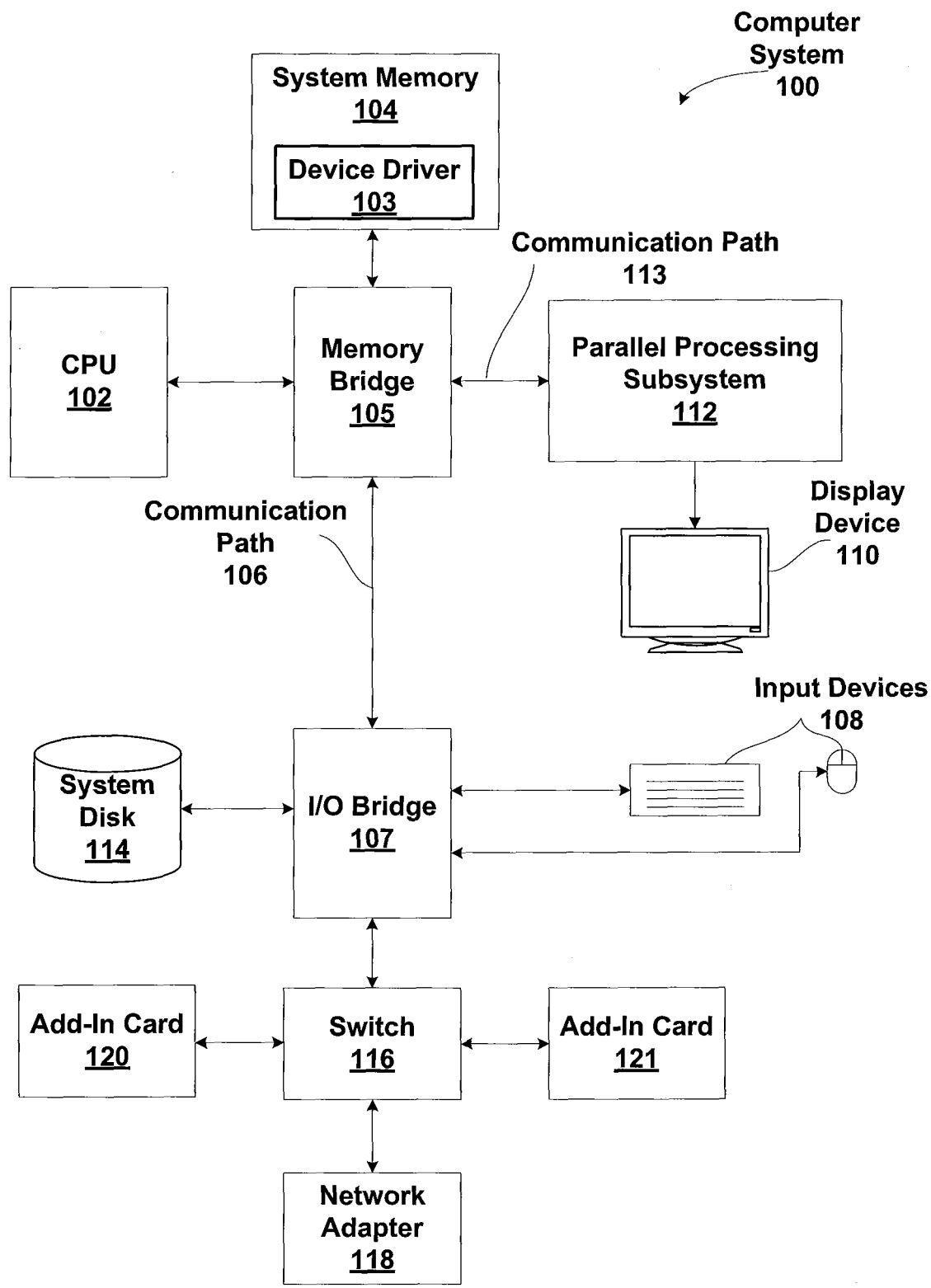
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
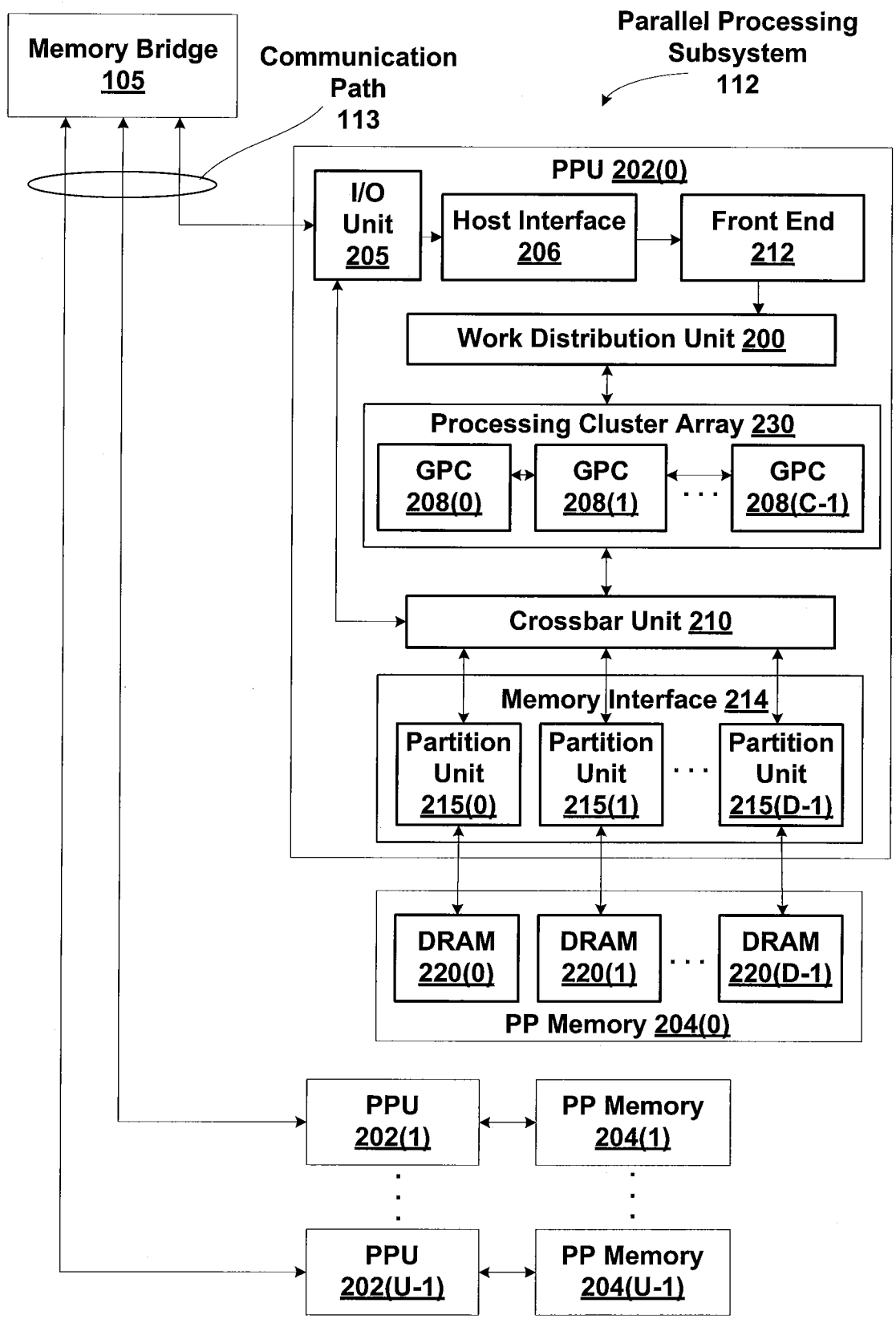
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
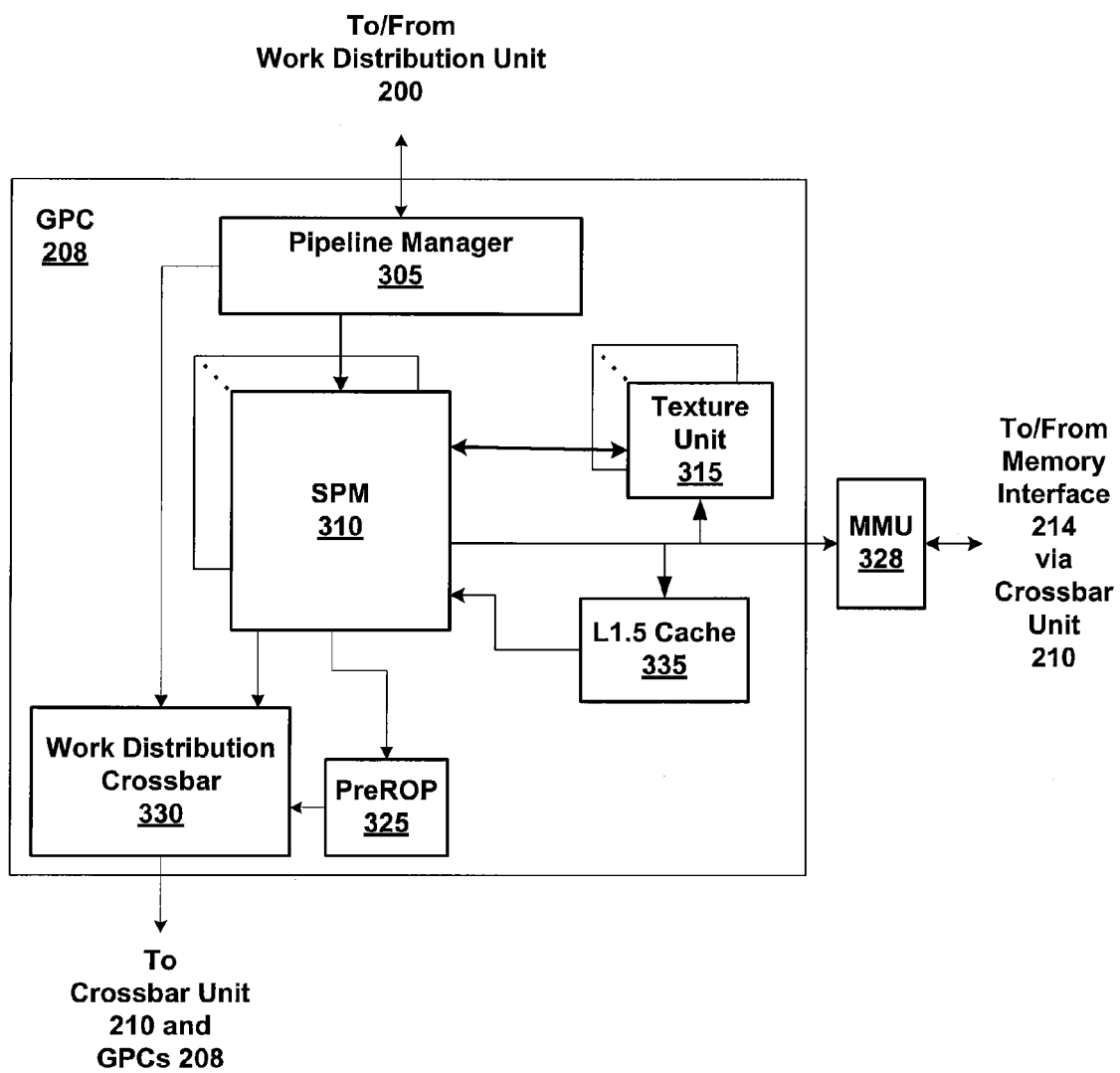
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104.

It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
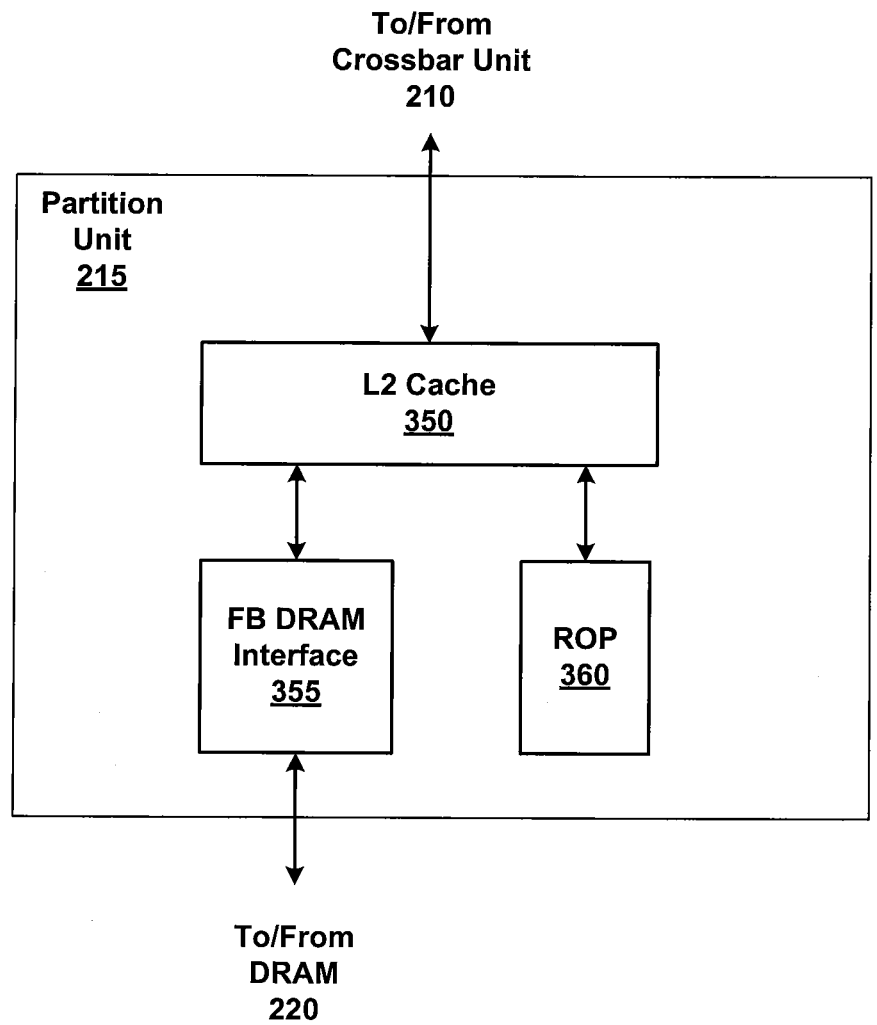
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
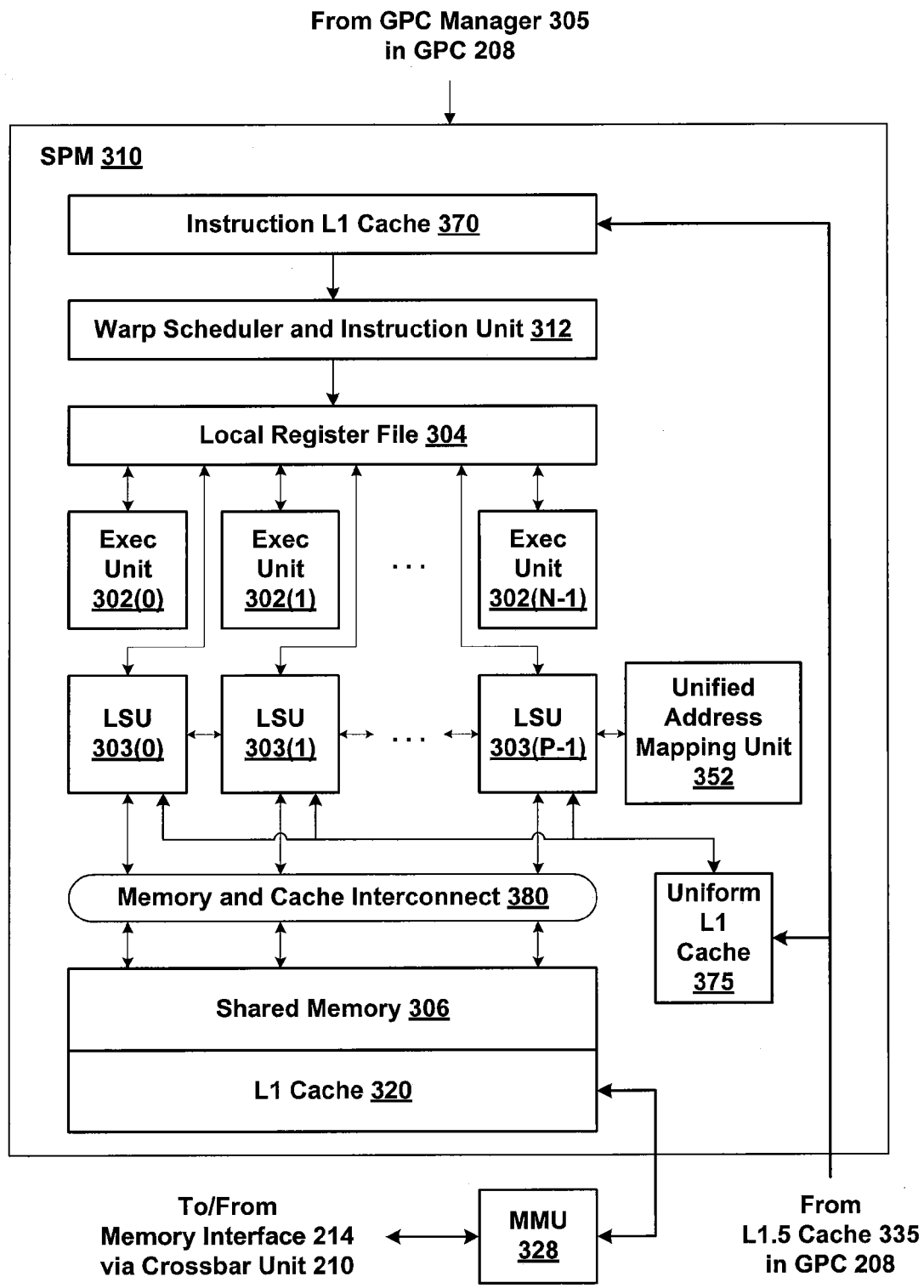
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Unified Crossbar Unit

Figure 4:
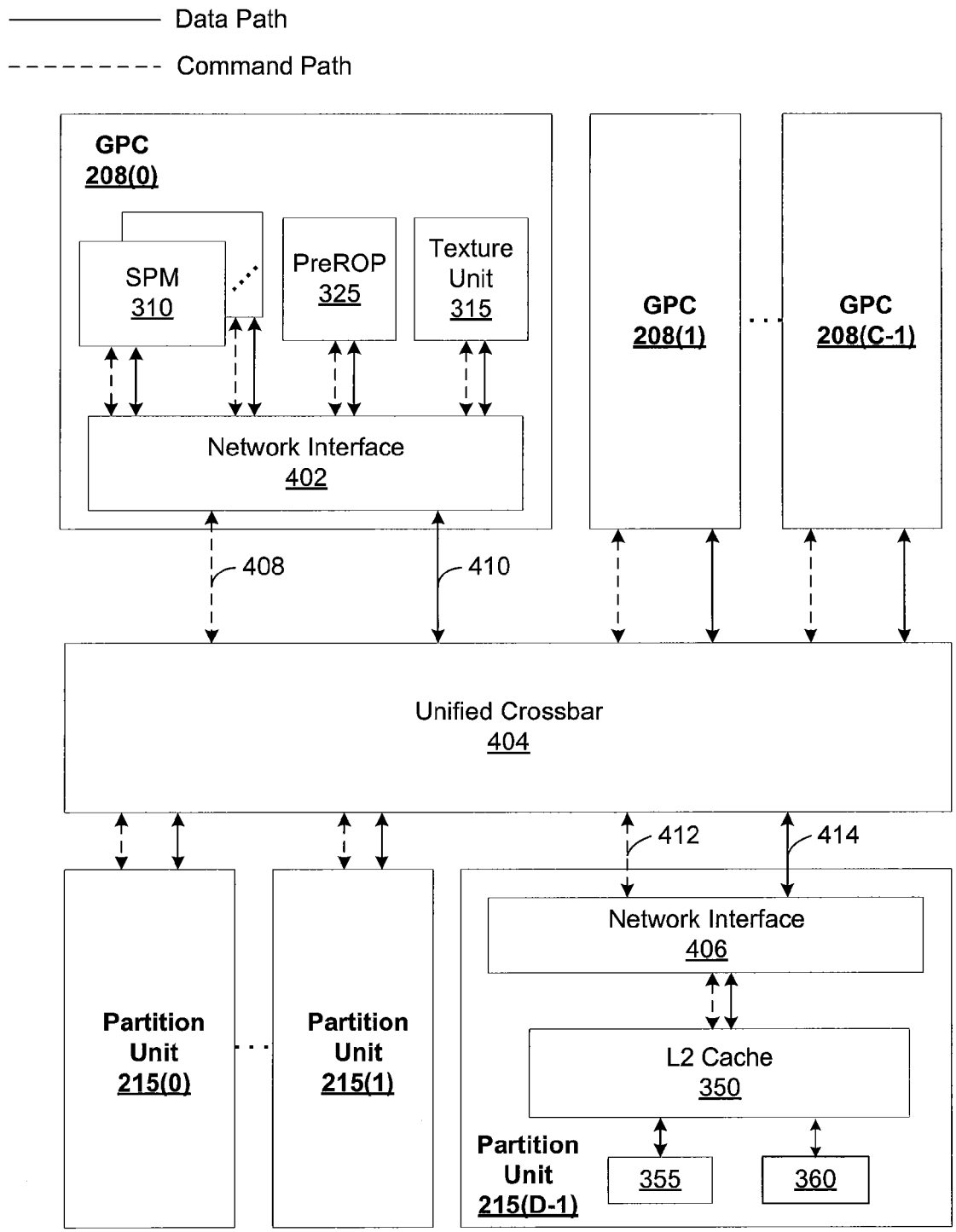
FIG. 4 illustrates a unified crossbar unit that connects the different components within the parallel processing unit of FIG. 2, according to one embodiment of the present invention.

FIG. 4 illustrates a unified crossbar unit 404 that connects the different components within the parallel processing unit of FIG. 2, according to one embodiment of the present invention. As shown, the unified crossbar unit 404 connects each of the GPCs 208 within the PPU 202 to the other GPCs 208 and the different partition units 215. Each of the GPCs 208 and the partition units 215 communicate via the unified crossbar unit 404 in a similar fashion. The unified crossbar unit 404 corresponds to the crossbar unit 210. For the purposes of discussion only, the GPC 208(0) and the partition unit 215(D−1) are discussed in greater detail.

The different components within the GPC 208(0), such as the SPM 310 and the preROP 325, communicate with components within the other GPCs 208 and the different partition units, such as partition unit 215(D−1), over the unified crossbar unit 404. Each component within the GPC 208(0) is associated with a data path for transmitting high bandwidth data packets (referred to herein as "data packets") over the unified crossbar unit 404 via the graphics network interface 402 within the GPC 208(0) and a command path for transmitting commands or low bandwidth data packets (referred to herein as "command packets") over the unified crossbar unit 404 via the graphics network interface 402. A data packet or a command packet is any unit of data for transmission between a source client and a destination client.

The graphics network interface 402 manages and arbitrates the data and commands received from the different components within the GPC 208(0). At each clock cycle, the graphics network interface 402 optionally selects a particular packet of high bandwidth data to be transmitted to the unified crossbar unit 404 via the data path 410 and a particular command or a packet of low bandwidth data to be transmitted to the unified crossbar unit 404 via the command path 408. The graphics network interface 402 also manages and arbitrates the data packets received from other components within the different GPCs 208 or the partition units 215 via the unified crossbar unit 404 for transmission to the appropriate destination components within the GPC 208(0). Similar to the graphics network interface 402 within the GPC 208(0), the frame buffer network interface 406 within the partition unit 215(D−1) manages and arbitrates the data and commands being transmitted to and received from the L2 cache 350 over the unified crossbar unit 404.

The unified crossbar unit 404 includes multiple slices for transmitting data from source components to destination components thus increasing the overall available bandwidth for data and command transmission within the parallel processing subsystem 112. In one embodiment, the unified crossbar unit 404 includes four slices. The unified crossbar unit 404 is typically provisioned with a bandwidth that is larger than the bandwidth requirement of any one component within the GPCs 208 or the partition units 215. Such extra provisioning allows the unified crossbar unit 404 to transmit data associated with a component having the highest bandwidth requirements efficiently and still have additional bandwidth available for transmitting data associated with other components.

Figure 5:
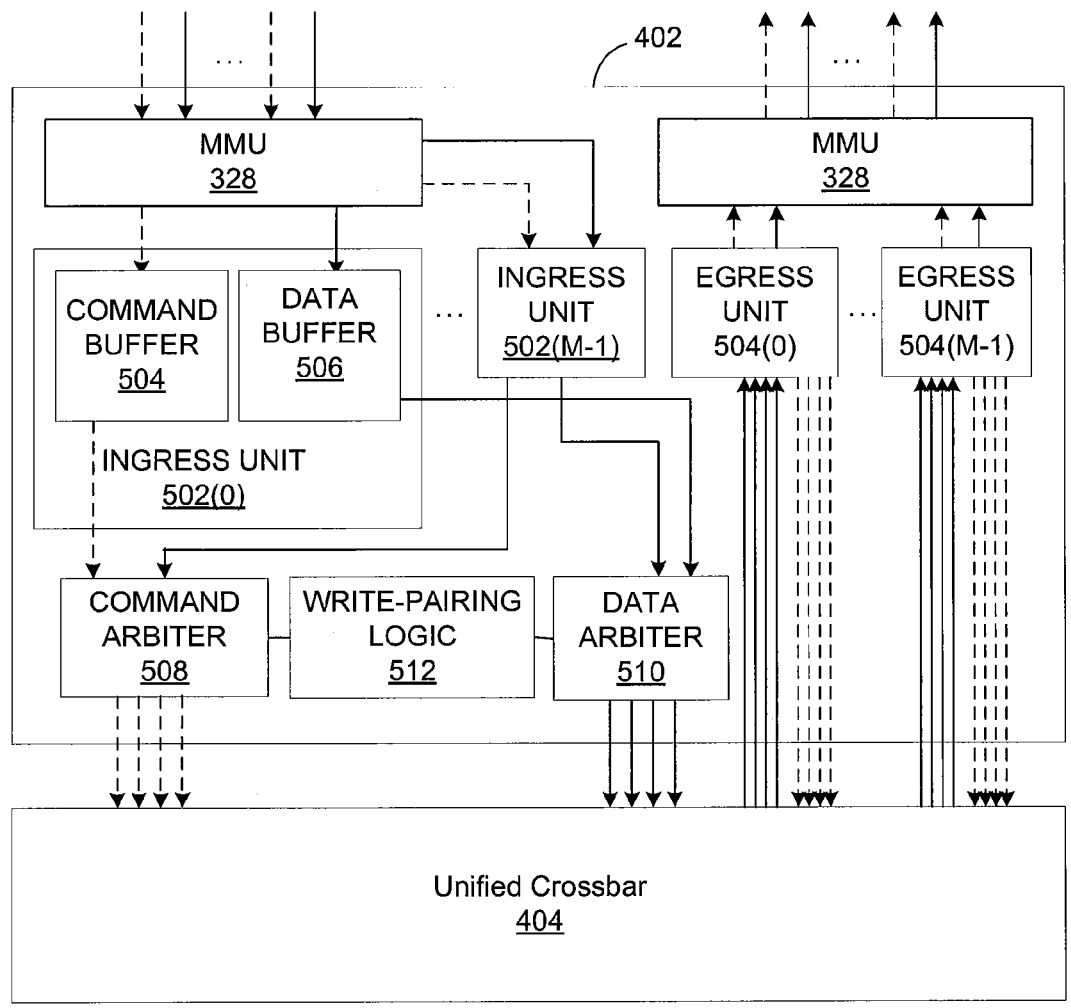
FIG. 5 is a detailed block diagram of the graphics network interface of FIG. 4, according to one embodiment of the present invention.

FIG. 5 is a detailed block diagram of the graphics network interface 402 of FIG. 4, according to one embodiment of the present invention. As shown, the graphics network interface 402 includes a memory management unit 328, ingress units 502, egress units 504, a command arbiter 508, a data arbiter 510, write pairing logic 512. Each component in the GPC 208(0), such as the SPM 310 and the preROP 325, is associated with a particular ingress unit 502 and egress unit 504.

In operation, the MMU 328 receives command and data packets from the different components within the GPC 208(0). Each data packet and command packet includes a virtual memory address and the command or data payload. The MMU 328 translates virtual memory address in a command or data packet into physical memory addresses, from which destination information, such as the destination component and destination port, is determined. For a particular command or data packet received from a specific component within the GPC 208(0), the MMU 328 transmits the translated physical memory address and the command or data payload of the particular command or data packet to the ingress unit 502 associated with the specific component. For example, if the MMU 328 receives a data packet from an SPM 310, and the SPM 310 is associated with ingress unit 502(0), then the data packet (including the translated physical memory address) is transmitted to the ingress unit 502(0) for further processing.

Each ingress unit 502, such as the ingress unit 502(0), includes a command buffer 504 and a data buffer 506 for storing, respectively, the command packets and data packets received from the MMU 328. The command buffer 504 and the data buffer 506 store the command and data packets until those packets can be transmitted to the destination components over the unified crossbar unit 404. In one embodiment, the command buffer 504 and the data buffer 406 are multi-threaded buffers.

At each clock cycle, the command arbiter 508 selects a command packet stored in the command buffer 504 of a particular ingress unit 502 associated with a specific component for transmission over one slice of the unified crossbar unit 404. Similarly, the data arbiter 510 selects a data packet stored in the data buffer 506 of a particular ingress unit 502 associated with a specific component for transmission to one slice of the unified crossbar unit 404. Importantly, the particular ingress unit 502 from which the data packet is selected by the data arbiter 510 need not match the particular ingress unit 502 from which the command packet is selected by the command arbiter 508.

The command arbiter 508 and data arbiter 510 select a command packet and data packet, respectively, for transmission over the unified crossbar unit 404 based on pre-determined conditions. These pre-determined conditions include, but are not limited to, priorities associated with the different components transmitting the data packets and/or command packets, the type of data being transmitted, write pairing conditions and the ability of the destination component to accept the data packet or the command packet. Specifically, the command arbiter 508 and the data arbiter 510 prioritize command and data packets received from components within the GPC 208(0) that are of a higher priority than other components. Similarly, certain types of data traffic, such as isochronous data, have a higher transmission priority than other types of data traffic. The type of data traffic is determined by the component from which the data was received and/or is included in the data packet.

In addition to the prioritizing based on the different components and the types of data, the command arbiter 508 and the data arbiter 510 strive to transmit a write command packet and a corresponding data packet to a destination unit via the unified crossbar unit 404 within some pre-determined number of clock cycles of one another. The write pairing logic 512 maintains an association between a write command packet stored in a particular command buffer 504 and any corresponding data packets stored in a data buffer 506. The command arbiter 508 determines via the write paring logic 512 whether the data packets corresponding to a selected write command packet are available for transmission to the destination unit via the unified crossbar unit 404. If so, then the data packets and the write command packet are transmitted to the destination unit. If not, then the write command packet is stalled until the data packets are available. Similarly, the data arbiter 510 determines via the write paring logic 512 whether the write command packet corresponding to a selected data packet is available for transmission to the destination unit via the unified crossbar unit 404. If so, then the data packet and the write command packet are transmitted to the destination unit. If not, then the data packet is stalled until the write command packet is available. In such a fashion, the command arbiter 508 and data arbiter 510 transmit write command packets and corresponding data packets within some pre-determined number of clock cycles of one another to the destination component.

The network interface 402 also receives command packets and data packets from different components within the other GPCs 208 or the partition units 215 via the unified crossbar unit 404 for distribution to destination components within the GPC 208(0). The egress units 504, each associated with a particular component within the GPC 208(0), manage the distribution of command and data packets received from the unified crossbar unit 404 to the different components within the GPC 208(0). In one embodiment, each egress unit 504 operates in a manner similar to the ingress unit 502 described above.

Figure 6:
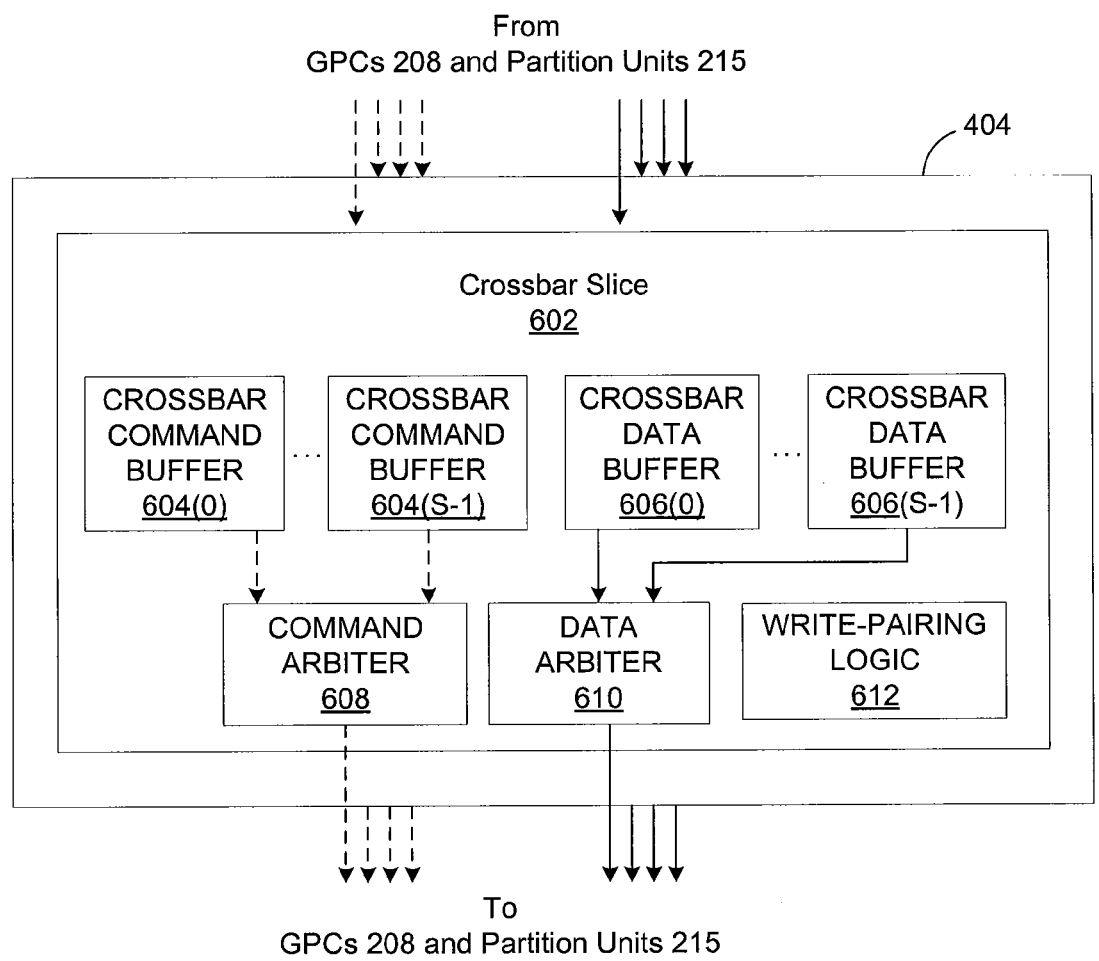
FIG. 6 is a detailed block diagram of a unified crossbar unit slice within the unified crossbar unit of FIG. 4, according to one embodiment of the invention.

FIG. 6 is a detailed block diagram of a slice 602 within the unified crossbar unit 404 of FIG. 4, according to one embodiment of the invention. As shown, the slice 602 includes crossbar command buffers 604, crossbar data buffers 606, a command arbiter 608, a data arbiter 610 and write pairing logic 612.

Each network interface within a GPC 208 or a partition unit 215 that transmits and/or receives data and command via the unified crossbar unit 404 is associated with a particular crossbar command buffer 604 and a crossbar data buffer 606 in each slice 602. For example, network interface 402 is associated with crossbar command buffer 604(0) and crossbar data buffer 606(0). Command packets transmitted by the network interface 402 to the slice 602 are stored in the crossbar command buffer 604(0) until the command packets can be transmitted to the associated one or more destination clients. Similarly data packets transmitted by the network interface to the slice 602 are stored in the crossbar data buffer 606(0) until the data packets can be transmitted to the associated one or more destination clients.

The command arbiter 608 and the data arbiter 610 operate in a fashion similar to the command arbiter 508 and data arbiter 510 within the network interface 502. Specifically, at each clock cycle, the command arbiter 608 and data arbiter 610 may select a command packet and data packet, respectively, for transmission to a destination component. As previously described herein, the pre-determined conditions include, but are not limited to, priorities associated with the different components transmitting the data packets and/or command packets, the type of data being transmitted, write pairing conditions and the ability of the destination component to accept the packet. In one embodiment, the command arbiter 608 and the data arbiter 610 include buffering logic such that non-blocking data and command traffic is given higher transmission priority while blocking data and command traffic is given lower transmission priority. In another embodiment, dedicated buffers are included in the slice 602 for storing data and command traffic that require a certain guaranteed transmission rate and are, therefore, arbitrated separately.

In one embodiment, a data buffer and/or a command buffer can be a first-in-first-out (FIFO) buffer.

Figure 7:
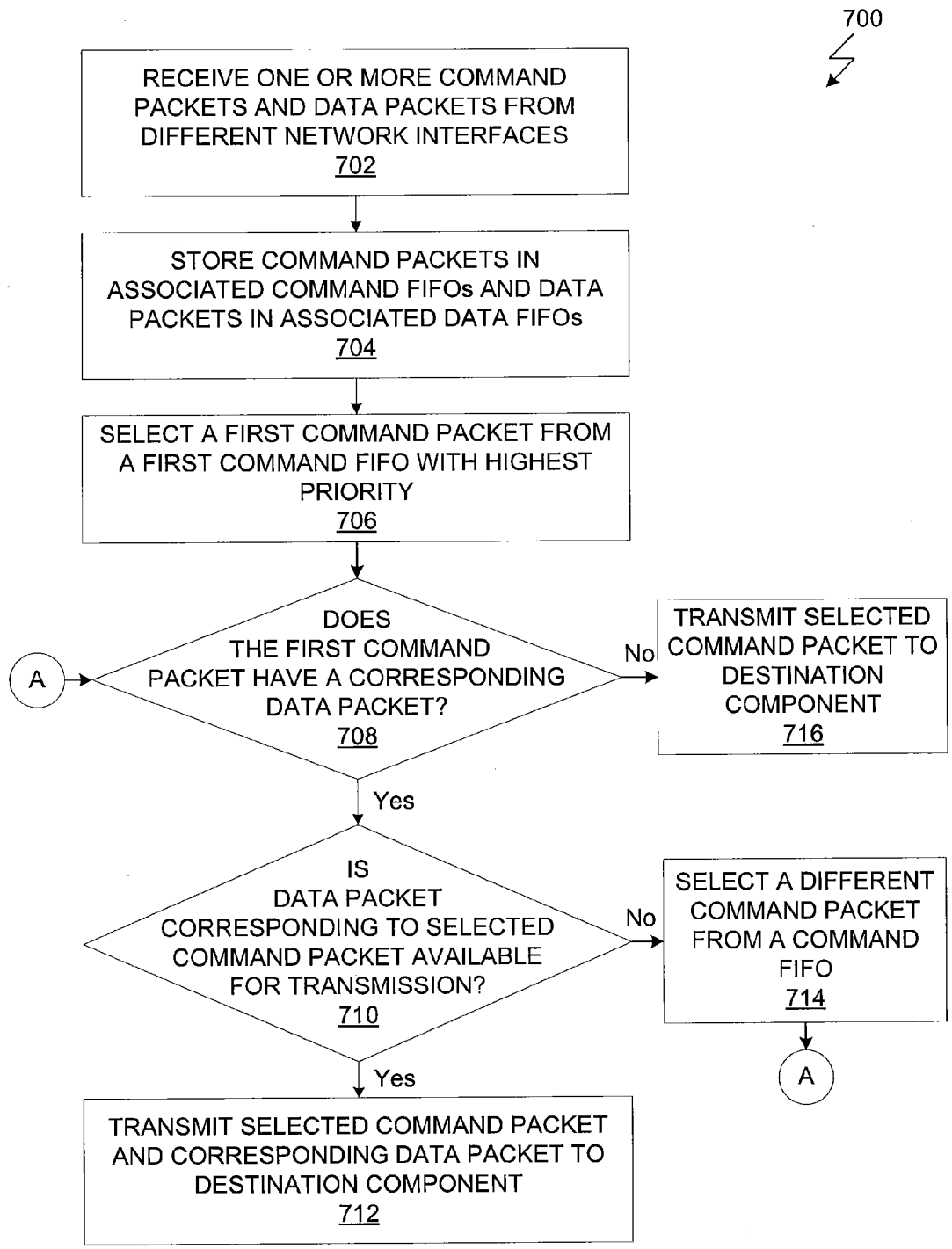
FIG. 7 is a flow diagram of method steps for selecting a data packet from a data buffer and a command packet from a command buffer for transmission to a destination unit, according to one embodiment of the present invention.

FIG. 7 is a flow diagram of method steps for selecting a data packet from a data buffer and a command packet from a command buffer for transmission to a destination unit, according to one embodiment of the present invention. Although the method steps are described in conjunction with the systems for FIGS. 1-6, persons skilled in the art will understand that any system configured to perform the method steps, in any order, is within the scope of the invention.

The method 700 begins at step 702, where the slice 602 receives one or more command packets and one or more data packets from the network interfaces, such as the network interface 402 and the network interface 406. At step 704, each command packet is stored in a crossbar command buffer 604 associated with the source client subsystem of the command packet. Similarly, each data packet is stored in a crossbar data buffer 606 604 associated with the source client subsystem of the data packet.

At step 706, the command arbiter 608 selects a first command packet from a first crossbar command buffer 604 with the highest priority. At step 708, using the write-pairing logic 612, the command arbiter 608 determines whether the command packet has a corresponding data packet. If not, then the method 700 proceeds to step 716, where the command packet is transmitted to the destination client subsystem.

If, however, the command packet has a corresponding data packet, then the method 700 proceeds to step 710, where the data arbiter 610 determine whether the data packet corresponding to the selected command packet is available for transmission. If so, then the method proceeds to step 712, where the selected command packet and the corresponding data packet are transmitted to the destination client subsystem. If, however, the data packet corresponding to the selected command packet is not available for transmission, then the command packet is stalled and a different command packet may be selected for transmission.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for transmitting data packets between a plurality of client subsystems, the method comprising:
   receiving a plurality of higher-bandwidth data packets and a plurality of lower-bandwidth data packets from the plurality of client subsystems, wherein each higher-bandwidth data packet and each lower-bandwidth data packet is associated with a source client subsystem, one or more destination client subsystems and a data type, and wherein each client subsystem is associated with a plurality of different higher-bandwidth memory buffers for storing higher-bandwidth data packets and a plurality of different lower-bandwidth memory buffers for storing lower-bandwidth data packets;
   storing the plurality of higher-bandwidth data packets and the plurality of lower-bandwidth data packets in memory buffers by:
      storing each higher-bandwidth data packet in a higher-bandwidth memory buffer associated with the source client subsystem associated with the higher-bandwidth data packet; and
      storing each lower-bandwidth data packet in a lower-bandwidth memory buffer associated with the source client subsystem associated with the lower-bandwidth data packet; and
   at a first clock cycle, selecting a first higher-bandwidth data packet for transmission to the one or more destination client subsystems associated with the first higher-bandwidth data packet based on one or more pre-determined conditions; or
   at a first clock cycle, selecting a first lower-bandwidth data packet for transmission to the one or more destination client subsystems associated with the first lower-bandwidth based on the one or more pre-determined conditions, and, after the first clock cycle, determining whether a second higher-bandwidth data packet corresponding to the first lower-bandwidth data packet is available in the buffer memories for transmission.

2. The method of claim 1, wherein the step of selecting the first higher-bandwidth data packet comprises determining that the source client subsystem associated with the first higher-bandwidth data packet has a higher priority than the source client subsystem associated with the other higher-bandwidth data packets stored in the memory buffers.

3. The method of claim 1, wherein the step of selecting the first lower-bandwidth data packet comprises determining that the source client subsystem associated with the first lower-bandwidth data packet has a higher priority than the source client subsystem associated with the other lower-bandwidth data packets stored in the memory buffers.

4. The method of claim 1, wherein the step of selecting the first higher-bandwidth data comprises determining that the data type associated with the first higher-bandwidth data packet has a higher priority than the data types associated with the other higher-bandwidth data packets stored in the memory buffers.

5. The method of claim 1, wherein the step of selecting the first lower-bandwidth data packet comprises determining that the first lower-bandwidth data packet corresponds to a write command.

6. The method of claim 1, wherein the second higher-bandwidth data packet is available in the buffer memories for transmission and the method further comprising the step of selecting the second higher-bandwidth data packet associated with the first lower-bandwidth data packet for transmission.

7. The method of claim 1, wherein the second higher-bandwidth data packet is not available in the buffer memories for transmission and the method further comprising the step of stalling the transmission of the first lower-bandwidth data packet.

8. The method of claim 1, wherein higher-bandwidth data packets associated with a high priority data type are stored in a dedicated memory buffer.

9. The method of claim 1, wherein the memory buffers comprise multi-threaded first-in-first-out memory buffers.

10. The method of claim 1, wherein the higher-bandwidth data packets include data, and wherein the lower-bandwidth data packets include commands.

11. A unified crossbar coupled to a plurality of client unit, wherein the unified crossbar is configured to:
   receive a plurality of higher-bandwidth data packets and a plurality of lower-bandwidth data packets from the plurality of client subsystems, wherein each higher-bandwidth data packet and each lower-bandwidth data packet is associated with a source client subsystem, one or more destination client subsystems and a data type, and wherein each client subsystem is associated with a plurality of different higher-bandwidth memory buffers for storing higher-bandwidth data packets and a plurality of different lower-bandwidth memory buffers for storing lower-bandwidth data packets;
   store the plurality of higher-bandwidth data packets and the plurality of lower-bandwidth data packets in memory buffers by:
      storing each higher-bandwidth data packet in a higher-bandwidth memory buffer associated with the source client subsystem associated with the higher-bandwidth data packet; and
      storing each lower-bandwidth data packet in a lower-bandwidth memory buffer associated with the source client subsystem associated with the lower-bandwidth data packet; and
   at a first clock cycle, select a first higher-bandwidth data packet for transmission to the one or more destination client subsystems associated with the first higher-bandwidth data packet based on one or more pre-determined conditions; or
   at the first clock cycle, select a first lower-bandwidth data packet for transmission to the one or more destination client subsystems associated with the first lower-bandwidth based on the one or more pre-determined conditions, and, after the first clock cycle, determine whether a second higher-bandwidth data packet corresponding to the first lower-bandwidth data packet is available in the buffer memories for transmission.

12. The unified crossbar of claim 11, wherein, to select the first higher-bandwidth data packet, the unified crossbar is further configured to determine that the source client subsystem associated with the first higher-bandwidth data packet has a higher priority than the source client subsystem associated with the other higher-bandwidth data packets stored in the memory buffers.

13. The unified crossbar of claim 11, wherein, to select the first lower-bandwidth data packet, the unified crossbar is further configured to determine that the source client subsystem associated with the first lower-bandwidth data packet has a higher priority than the source client subsystem associated with the other lower-bandwidth data packets stored in the memory buffers.

14. The unified crossbar of claim 11, wherein, to select the first higher-bandwidth data, the unified crossbar is further configured to determine that the data type associated with the first higher-bandwidth data packet has a higher priority than the data types associated with the other higher-bandwidth data packets stored in the memory buffers.

15. The unified crossbar of claim 11, wherein, to select the first lower-bandwidth data packet, the unified crossbar is further configured to determine that the first lower-bandwidth data packet corresponds to a write command.

16. The unified crossbar of claim 11, wherein the second higher-bandwidth data packet is available in the buffer memories for transmission, and the unified crossbar is further configured to select the second higher-bandwidth data packet associated with the first lower-bandwidth data packet for transmission.

17. The unified crossbar of claim 11, wherein the second higher-bandwidth data packet is not available in the buffer memories for transmission, and the unified crossbar is further configured to stall the transmission of the first lower-bandwidth data packet.

18. The unified crossbar of claim 11, wherein higher-bandwidth data packets associated with a high priority data type are stored in a dedicated memory buffer.

* * * * *

UNITED STATES PATENT AND TRADEMARK OFFICE
CERTIFICATE OF CORRECTION

| | | |
|---|---|---|
| PATENT NO. | : 9,098,383 B1 | Page 1 of 1 |
| APPLICATION NO. | : 12/792684 | |
| DATED | : August 4, 2015 | |
| INVENTOR(S) | : Sean J. Treichler et al. | |

It is certified that error appears in the above-identified patent and that said Letters Patent is hereby corrected as shown below:

In the Claims

Column 16, Claim 11, Line 24, please delete "unit," and insert --subsystems,--.

Signed and Sealed this
Twenty-sixth Day of April, 2016

Michelle K. Lee
*Director of the United States Patent and Trademark Office*